June 21, 1932.  A. A. GRIFFITH ET AL  1,864,430
FLOWMETER
Filed Sept. 28, 1929
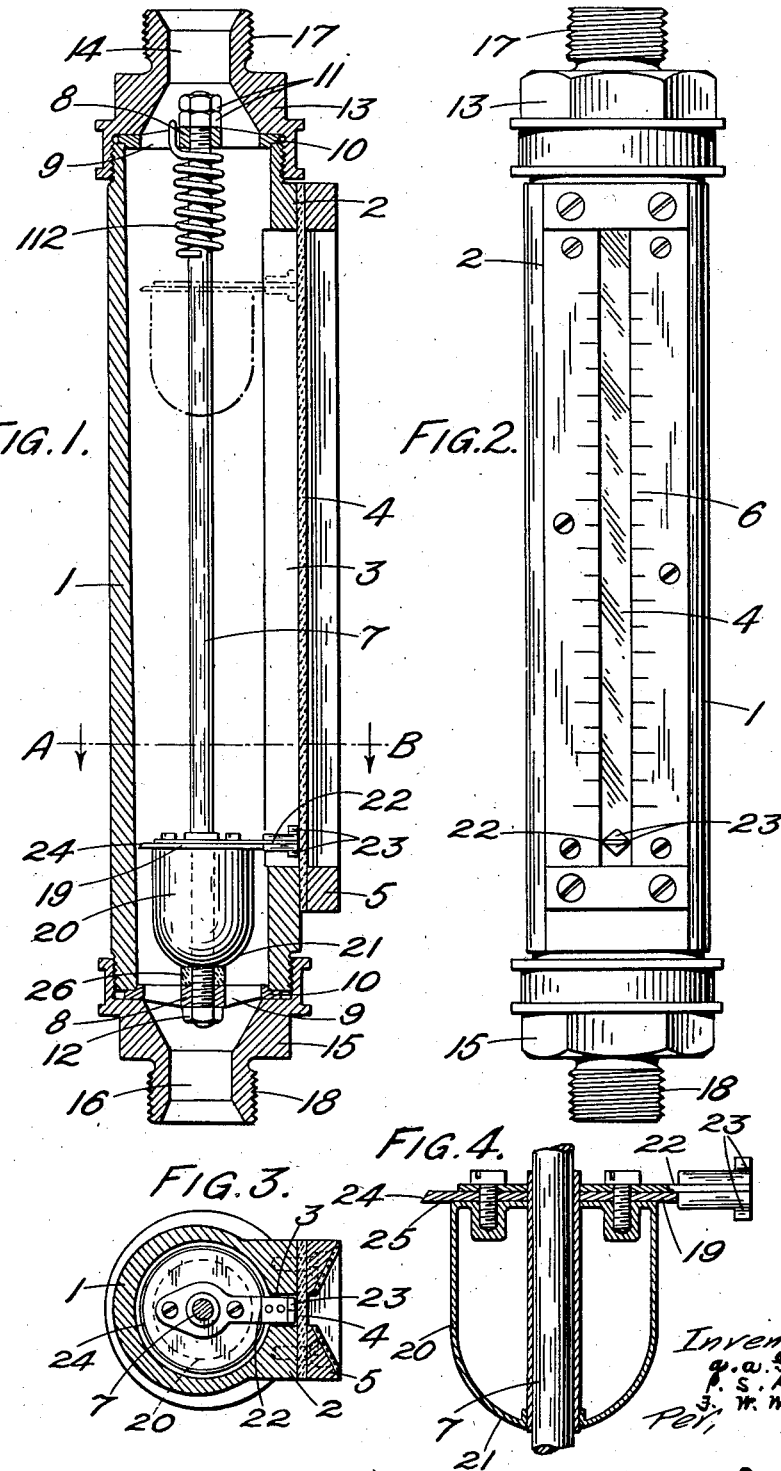

Patented June 21, 1932

1,864,430

UNITED STATES PATENT OFFICE

ALAN ARNOLD GRIFFITH, OF KENSINGTON, LONDON, AND PAUL STEVENSON KERR AND FREDERICK WILLIAM MEREDITH, OF SOUTH FARNBOROUGH, ENGLAND, ASSIGNORS TO ELLIOTT BROTHERS (LONDON) LIMITED, OF LONDON, ENGLAND, A COMPANY OF GREAT BRITAIN

FLOWMETER

Application filed September 28, 1929, Serial No. 395,840, and in Great Britain November 28, 1928.

This invention relates to flowmeters for fluid and is particularly intended for indicating the rate of consumption of gasoline by the internal combustion engines of aircraft.

The invention has for object to provide a flowmeter which will indicate mass flow and in which the readings are independent of density and viscosity changes due to temperature variations.

The invention further has for object to provide a flowmeter consisting of a tubular member tapered internally outwards from the bottom towards the top and containing a transversely arranged disc axially movable of a rod extending longitudinally of the member.

Referring to the accompanying drawing:—

Fig. 1 is a longitudinal sectional view, partly in elevation;

Fig. 2 an elevational view at right angles to Fig. 1;

Fig. 3 a cross section on the line A—B of Fig. 1; and

Fig. 4 an enlarged sectional view of the sinker.

1 is a vertical tubular member which is tapered internally outwards from the bottom towards the top. The member 1 has at one side an integral longitudinal protuberance 2 through which is formed a slot 3 closed by a sheet 4 of transparent material, secured in place by a bezel 5, the front face of which is scaled, as at 6. Extending longitudinally and centrally of the member 1, is a rod 7 which passes at its upper and lower ends through bosses 8, each carried by arms 9 from rings 10 which rest, respectively, on the upper and lower ends of the tubular member 1. The rod 7 is threaded at each end and is adjustably secured by nuts 11, 12. A spring 112 encircles the upper end of the rod 7 and is connected with one of the arms 9. The upper and lower rings 10 are secured by caps 13, 15 having central orifices 14, 16, respectively. The caps 13, 15, are screwed on to the ends of the member 1 and also threaded at 17, 18, respectively to receive union nuts. 19 is a disc contained within and arranged transversely of the member 1. On the underside of the disc 19 a closed hollow cylindrical sinker 20 having a rounded lower end 21 is mounted. The disc 19 and sinker 20, constituting a body of substantially greater density than the fluid being measured are mounted on the rod 7 in relation to which they are freely movable. A radial arm 22 is secured to the upper face of the disc 19 and projects into the slot 3 within its end adjacent the transparent closure 4. Blocks 23, 23 of ivorine or other white material unaffected by the fluid to be measured are mounted on the upper and lower faces of the arm 22 at its outer end. A short horizontal line may be placed on one or other of or between the blocks or may be constituted by the end of the radial arm 22. The diameter of the disc 19 is slightly less than the internal diameter of the member 1 when the disc is in its lowest position, and the diameter of the body of the sinker 20 is substantially less than that of the disc so that the clearance between the body of the sinker and the member 1 is sufficiently large to avoid errors due to viscosity.

The disc 19 which has been found most suitable for the reduction of error due to change of viscosity with temperature is that in which the edge connects a plane surface 25 on the lower or inflow side and a conical surface 24 on the upper or outflow side. The edge itself should be sharp and may have, for example, a radius of the order of 1/10000 inch. The disc may conveniently be 0.06 inch thick and the conical surface of the disc may, for example, lie at an angle of 30° to the central axis. The rod 7 should be sufficiently rigid to guide the disc 19 and the sinker 20 without vibration under all conditions experienced in flight. A stop 26 of leather or like material is mounted on the rod 7 to be engaged by the bottom of the sinker 20 when in its lowest position so as to prevent damage to the sinker, as by indentation, which would alter its volume as a result of shocks experienced in use or transit. The spring 112 prevents the disc rising too high in the member 1.

In use, the fluid supply is connected to the cap 15 and the cap 13 is connected to the engine. The disc 19 then assumes a position in the member 1 in accordance with the mass of fluid passing through the apparatus and its position is viewed through the transparent closure 4, the flow of fluid being then read off on the scale 6. This scale may be in two parts, that on one side of the bezel in tens of pounds per hour and the other in kilogrammes per hour. The tapering of the member 1 is preferably such that the scale of flow is uniform.

The density of the sinker is preferably approximately twice that of the mean density of the fluid.

What we claim is:—

1. A flowmeter for fluids comprising an upright tubular member having an inlet at the bottom, an outlet at the top and an interior which tapers outwardly from the bottom, fixed guide means in said tubular member, and a flow indicating device movable axially in said tubular member on said guide means and comprising a transversely disposed disc having a sharp edge at the intersection of a plane surface on its inflow side with a conical surface on its outflow side, a sinker attached to the disc and an indicator carried by said disc, the density of the flow indicating device being of the order of twice the average density of the liquid to be measured.

2. A liquid flowmeter comprising a longitudinally slotted, upright tubular member having a liquid inlet at its lower end, a liquid outlet at its upper end and an interior chamber tapered outwardly from the lower end, a transparent closure for the longitudinal slot in said member, a guide rod mounted axially in said chamber, and a flow indicating device movable axially on said guide rod in said chamber and comprising a transversely disposed disc having a sharp edge at the intersection of plane and conical surfaces on its inflow and outflow sides respectively, a sinker attached to the disc and a pointer carried by said disc and projecting into the slot.

Dated this 12th and 13th days of September 1929.

ALAN ARNOLD GRIFFITH.
PAUL STEVENSON KERR.
FREDERICK WILLIAM MEREDITH.